Dec. 26, 1944.  W. W. PAGET  2,365,835
DRILLING APPARATUS
Filed Aug. 1, 1941  2 Sheets-Sheet 2
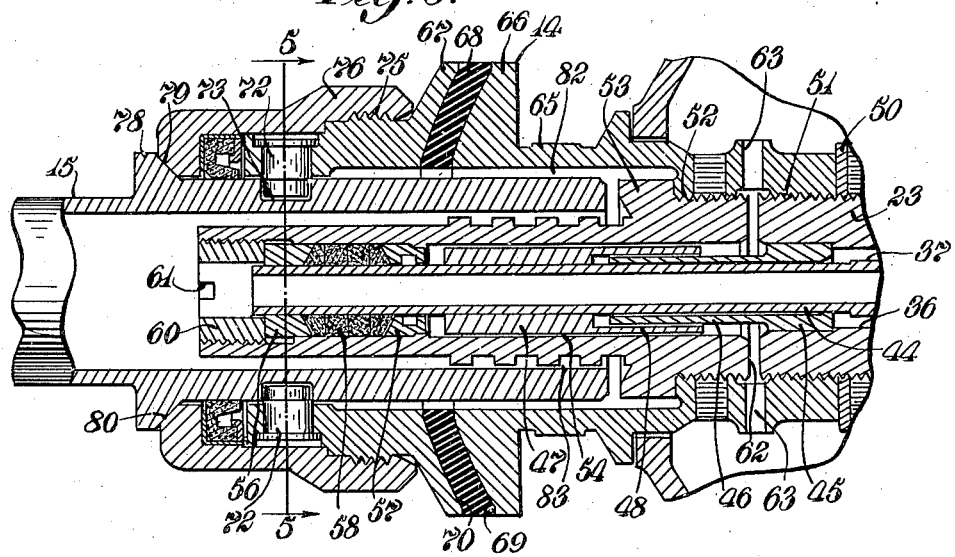
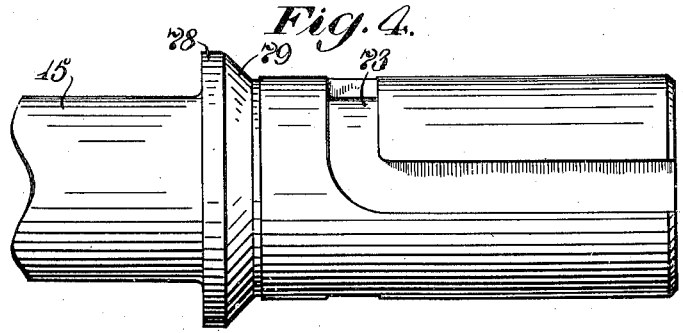
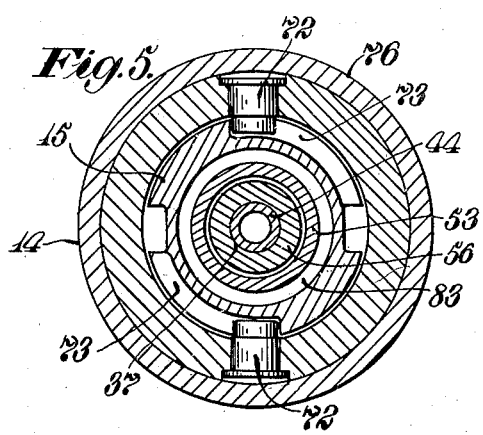
Inventor:
Wm W. Paget.
by
Louis A. Maxson.
Atty.

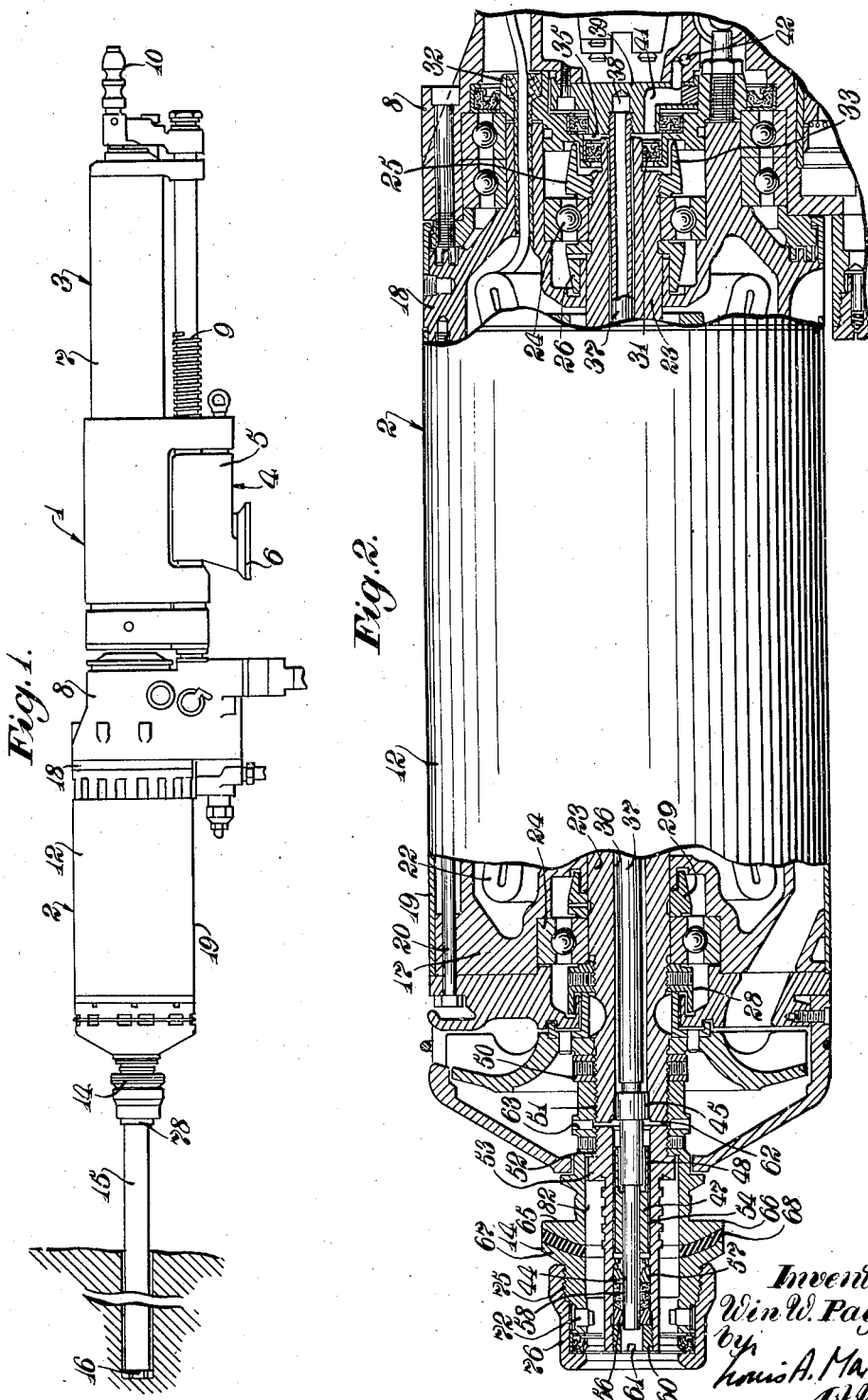

Patented Dec. 26, 1944

2,365,835

UNITED STATES PATENT OFFICE 2,365,835

DRILLING APPARATUS

Win W. Paget, Michigan City, Ind., assignor to Sullivan Machinery Company, a corporation of Massachusetts Application August 1, 1941, Serial No. 405,066

5 Claims. (Cl. 255—47)

This invention relates to drilling apparatus, and more particularly to chuck mechanisms for drills of the rotary type.

An object of this invention is to provide an improved chuck mechanism for a drilling apparatus. Another object is to provide an improved flexible chuck for a drill of the rotary type. Still another object is to provide an improved chuck comprising pieces bonded together by a flexible material whereby a drill rod, supported within the chuck, is permitted to move angularly relative to the drill actuating means but is normally maintained in a given line. Still another object is to provide an improved flexible chuck for a drilling apparatus of the rotary type, the chuck comprising pieces bonded together by a flexible material in such a manner that there is produced within the material, on angular movement of a drill rod relative to the drilling apparatus, stresses in shear and compression. Still another object is to provide an improved flexible chuck comprising pieces bonded together by a flexible material disposed between and secured to curved surfaces. Other objects and advantages of the invention will, however, hereinafter more fully appear.

In the accompanying drawings there is shown for purposes of illustration one form which the invention may assume in practice.

In these drawings:

Fig. 1 is a side elevational view of a drilling apparatus in which an illustrative embodiment of the invention is incorporated.

Fig. 2 is an enlarged view of the drill rotating motor and the improved chuck with parts shown in section.

Fig. 3 is an enlarged fragmentary sectional view showing details of the chuck and associated parts of the drilling apparatus.

Fig. 4 is a view showing the rear portion of the drill rod in side elevation.

Fig. 5 is a transverse sectional view taken on the plane of the line 5—5 Fig. 3.

In the illustrative embodiment of the invention there is shown a drilling mechanism, generally designated 1, comprising bit rotation means generally designated 2, drill bit feeding means generally designated 3 and drill guiding and supporting means generally designated 4.

The supporting and guiding means 4 comprises a trunnion member 5 having a swivel plate 6 adapted to be clamped in the saddle mounting of a suitable support. The trunnion member slidingly supports a feed cylinder 7 of a hydraulic feeding means, the cylinder containing a usual reciprocable feed piston having its piston rod projecting forwardly and supporting at its forward end a control head 8. Associated with the hydraulic feeding means is a manual feeding means including a feed screw 9 operated by a hand crank 10, for manually feeding the feed cylinder relative to the trunnion member. The rotation means 2 includes a rotary motor 12 supported by the control head 8 and having secured to its power shaft an improved chuck 14 which receives the shank of a hollow drill rod 15 by which a usual drill bit 16 is carried. It will be noted that this apparatus is adapted to effect rectilinear feed of the drill bit and to rotate it on its axis.

Referring to the rotary motor 12 which is shown herein as being of the electric type, it will be noted that front and rear heads 17 and 18 are held in assembled relation with respect to a motor casing 19 by usual tie bolts 20. The motor has a usual field 22, and a rotor mounted on a shaft 23 which is supported in bearings 24, 24 arranged in the motor heads. Threadedly connected to the rear end of the rotor shaft is a bearing retaining member 25, and the inner race of the rear bearing 24 is held between a member 26 engaging a shoulder on the shaft and the member 25, in the manner shown. The inner race of the front bearing 24 is held in a similar manner between a member 28 threaded on the forward portion of the shaft and a member 29 fixed to the shaft. Arranged on the rear end of the rotor shaft is a packing ring 31 cooperating with an annular flange on a member 32 secured to the rear motor head 18 for providing a liquid seal. The member 25 also has a sleevelike portion 33 surrounding a cylindric portion of the member 32 to provide a liquid seal. These seals restrict in a very effective manner the flow of liquid from a space 35 to the bearings 24.

Extending axially through the rotor shaft is a bore 36, and arranged in this bore is a fluid conducting tube 37, the latter being somewhat smaller than the bore to provide a clearance between the tube and the shaft. The tube 37 is threaded at its rear end into a recess 38 formed in a member 39 secured to the control head 8, and suitable passages, not shown, are provided for connecting the recess to a suitable source of cleansing fluid, herein a source of liquid under pressure. Any liquid leaking around the rear end of the water tube to the space 35 is checked in its flow to the bearing 24 by the packing 31, and a passage 41 connects the space 35 to a vent 42 in the control head so that liquid may drain from the space to atmosphere. The forward portion of the tube 37 is reduced in cross section at 44, and this reduced portion extends through a bushing 45 pressed into position in the shaft bore. Extending from the forward end of the bushing is an integral sleeve portion 46 having a reduced outer diameter as compared with its rear portion, and the bushing and its sleeve portion fit loosely over the tube 37 to avoid frictional contact. Pressed onto the tube in advance of the bushing 45 is a bushing 47 having a rearwardly extending sleeve portion 48 fitting loosely over the sleeve portion 46. Threaded on the forward portion of the rotor shaft is a collar 50, and the chuck 14 is threaded on the shaft at 51 with its rear end abutting the collar. Threaded at 52 within the chuck 14 is a member 53 which rotates with the chuck, and extending longitudinally through this member is a bore 54 providing a small clearance around the bushing 47. Arranged in the bore 54 are washers 56 and 57 having disposed therebetween suitable packing 58. Threaded in the forward end of the bore 54 is an adjusting plug 60 provided with a screw driver slot 61, and this plug engages the forward washer 56. Upon adjustment of the plug 60, the front washer may be moved rearwardly to compress the packing 58 between the washers 56, 57 into tight sealing engagement with the exterior of the tube, thereby to reduce leakage rearwardly along the tube. Any liquid escaping past the packing passes through the space surrounding the bushing 47 and through a space 62 between the member 53 and the forward end of the rotor shaft to vent ports 63. The bushings 45 and 47 maintain the tube 37 central of the bore 36 and prevent any compression of the packing 58 from forcing the tube laterally. The rearwardly extending sleeve portion 48 on the bushing 47 cooperates with the sleeve portion 46 on the bushing 45 to provide a seal which prevents liquid passing to the vent port 63 from gaining admission to the bore in the rotor shaft by passing along the tube.

Referring to the improved chuck 14, it will be noted that it comprises a main body portion 65 which is made up of two pieces 66 and 67 bonded together by a flexible material 68 such as rubber. The pieces 66 and 67 are provided with curved surfaces 69 and 70 to which the material 68 is bonded or otherwise secured. These surfaces are shown here as forming portions of spheres, but it will be understood that surfaces of other curvatures may be satisfactory. By reason of the flexible material, relative movement between the pieces 66 and 67 is made possible, and, due to the curved surfaces, the stresses produced in the flexible material, when the piece 67 is moved relative to the piece 66 on angular movement of the drill rod 15, are in shear and compression, thereby reducing the tendency of pulling the pieces away from the bonding material. Projecting inwardly through radially extending ports in the forward end of the chuck body are pins 72 which fit within slots 73 on the shank of the drill rod for holding the latter in position within the chuck. Threaded on the chuck body at 75 is a collar 76 which extends over the outer ends of the pins 72 and holds them in place. Formed on the shank of the drill rod is an annular flange 78 having a beveled surface 79 which is held firmly in engagement with a beveled surface 80 on the forward end of the collar 76 when the drill rod is supported within the chuck. Between the chuck body 65 and the drill rod, at the rear end of the latter, is an annular space 82, and between the inner periphery of the drill rod and the member 53 there is another annular space 83, the spaces 82 and 83 providing adequate room for angular movement of the drill rod permitted by the flexible chuck.

While there is in this application specifically described one form which the invention may assume in practice, it will be understood that this form of the same is shown for purposes of illustration and that the invention may be modified and embodied in various other forms without departing from its spirit or the scope of the appended claims.

What I claim as new and desire to secure by Letters Patent is:

1. In a drilling apparatus, in combination, a motor for rotating a drill rod, and a flexible chuck for supporting the shank of said drill rod in driving relation with said motor for permitting limited angular movement between the axes thereof, said chuck including two pieces, one provided with a convex curved surface and the other provided with a concave curved surface of substantially the same curvature as the first, said convex curved surface facing toward said concave curved surface and spaced therefrom equal distances at all points on lines normal to the surfaces, means including a flexible material arranged between said curved surfaces for bonding said pieces together, means for detachably securing one of said pieces to the drive shaft of said motor, and means for detachably securing the shank of said drill rod to the other of said pieces.

2. In a drilling apparatus, in combination, a motor for rotating a drill rod, and a flexible chuck for supporting the shank of said drill rod in driving relation with said motor while permitting limited relative angular movement of the axes thereof, said chuck including two coaxial annular pieces having their adjacent surfaces conforming to portions of the surfaces of spheres having a common center, means including a layer of flexible material arranged between the adjacent surfaces of said pieces for bonding the latter together, means for securing one of said pieces to the drive shaft of said motor, and means for securing the shank of said drill rod to the other of said pieces.

3. In a drill chuck mechanism, the combination comprising a rotatable driving member having a socket adapted to receive the shank of a drill to be driven, a driven member to which the drill is connected for rotation therewith, and a flexible driving connection between said driving and driven members, said flexible driving connection being so constructed as to permit limited angular movement of the axis of said driven member relative to the axis of said driving member while maintaining a driving connection therebetween, the shank of the drill extending into said socket and said socket being so formed as to permit limited angular movement of the drill shank therein relative to said driving member upon such relative angular movement of the axes of said members.

4. In a drill chuck mechanism, the combination comprising a rotatable driving member having a socket adapted to receive the shank of a drill to be driven, a driven member to which the drill is connected for rotation therewith, and a flexible driving connection between said driving and driven members, said flexible connection surrounding said socket so that the drill shank extends into said socket within said connection, said flexible driving connection being so constructed as to permit limited angular movement of the axis of said driven member relative to the axis of said driving member while maintaining a driving connection therebetween, the shank of the drill extending into said socket and said socket being so formed as to permit limited angular movement of the drill shank therein relative to said driving member upon such relative angular movement of the axes of said members.

5. In a drill chuck mechanism, the combination comprising a rotatable driving member, a driven member to which a drill is connected for rotation therewith, said members cooperating to provide a socket adapted to receive the shank of the drill, and a flexible driving connection between said driving and driven members, said flexible connection being so constructed as to permit limited angular movement of the axis of said driven member relative to the axis of said driving member while the drive between said members is maintained, the shank of the drill extending into said socket and the socket being so formed as to permit limited angular movement of the drill shank therein relative to said driving member upon such angular movement of the axes of said members.

WIN W. PAGET.